(12) United States Patent
Hasegawa et al.

(10) Patent No.: US 7,857,674 B2
(45) Date of Patent: Dec. 28, 2010

(54) BONDING MEMBER BONDING METHOD AND METHOD FOR MANUFACTURING IMAGE DISPLAY APPARATUS

(75) Inventors: Mitsutoshi Hasegawa, Yokohama (JP); Kazuo Koyanagi, Atsugi (JP); Tokutaka Miura, Yokohama (JP); Kou Komatsu, Okazaki (JP); Nobuhiro Ito, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/335,889

(22) Filed: Dec. 16, 2008

(65) Prior Publication Data
US 2009/0173424 A1 Jul. 9, 2009

(30) Foreign Application Priority Data
Jan. 7, 2008 (JP) .............................. 2008-000455

(51) Int. Cl.
*H01J 9/00* (2006.01)
*H01J 9/24* (2006.01)
*H01J 9/40* (2006.01)
(52) U.S. Cl. .......................................... 445/25; 445/24
(58) Field of Classification Search .................. 445/24, 445/25
See application file for complete search history.

(56) References Cited

U.S. PATENT DOCUMENTS

| 6,109,994 A | * | 8/2000 | Cho et al. ...................... 445/25 |
| 6,113,450 A | | 9/2000 | Narayanan et al. |
| 6,739,929 B2 | | 5/2004 | Furukawa et al. |
| 7,294,034 B2 | | 11/2007 | Yamada et al. |

FOREIGN PATENT DOCUMENTS

| JP | 2001-279195 A | 10/2001 |
| JP | 2002-515392 A | 5/2002 |
| JP | 2002-184328 A | 6/2002 |
| WO | 99/59180 A1 | 11/1999 |

* cited by examiner

*Primary Examiner*—Mariceli Santiago
(74) *Attorney, Agent, or Firm*—Fitzpatrick, Cella, Harper & Scinto

(57) ABSTRACT

A bonding member, which can achieve a sufficient degree of vacuum without forming a gap caused by air bubbles that have been released out through the surface of the bonding member, a bonding method, an image display apparatus, and a manufacturing method therefor. The bonding member 92 of a strip has a first portion 92a and a second portion 92b. The first portion 92a has a uniform thickness $t_1$. The second portion 92b has a smaller thickness $t_2$ than the thickness $t_1$ of the first portion 92a and constitutes a side plane of the bonding member 92. The second portion 92b also has a shape such that a convexity and a concavity alternate along a longitudinal direction of the bonding member 92.

2 Claims, 8 Drawing Sheets

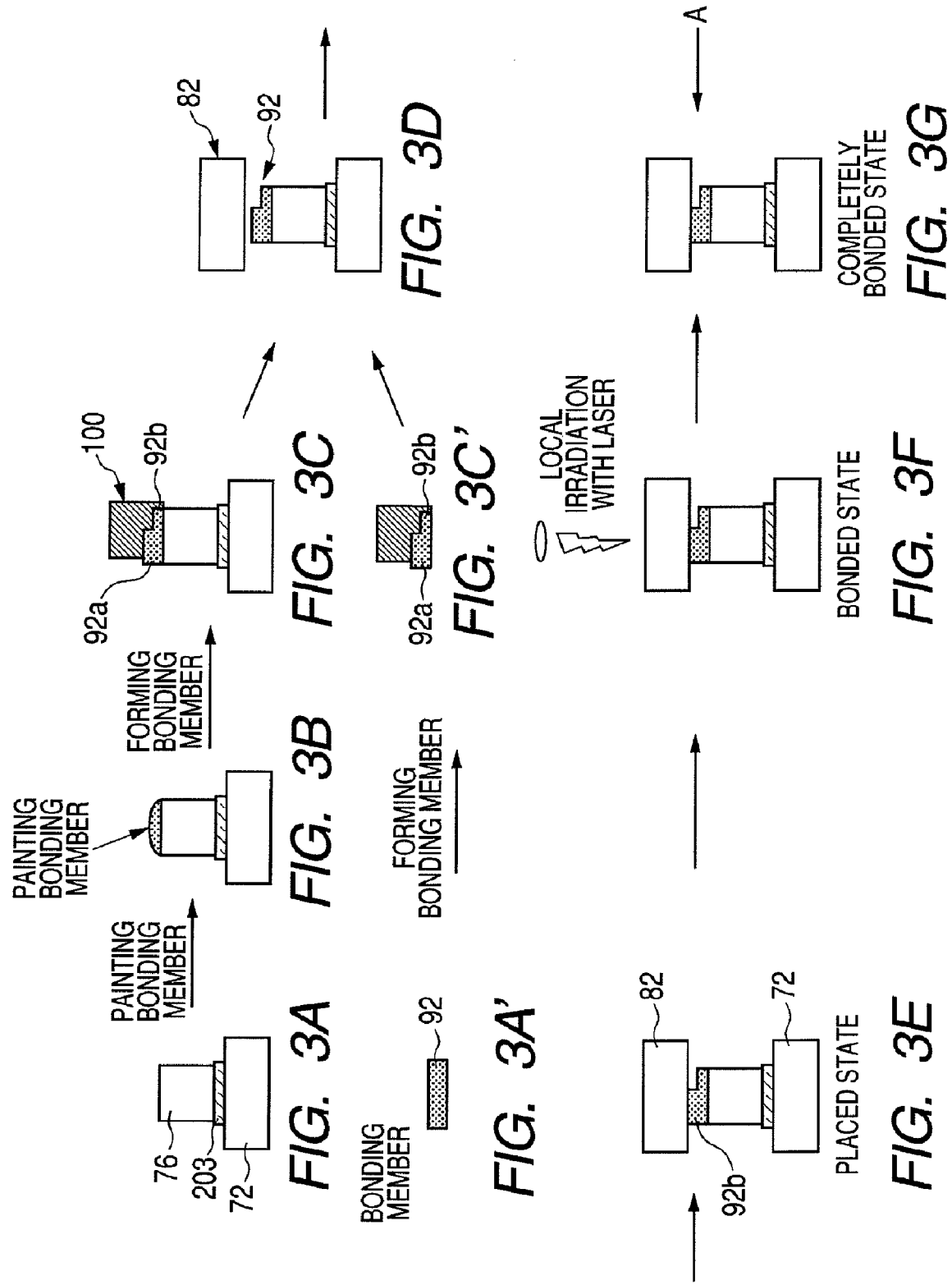

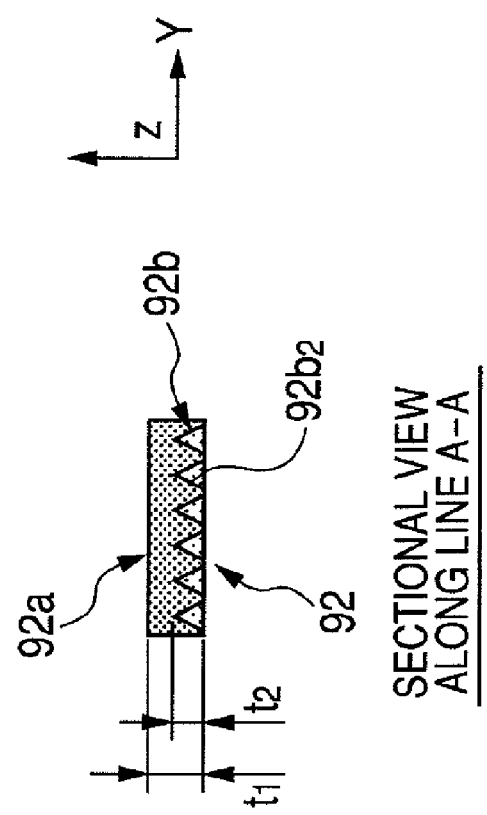
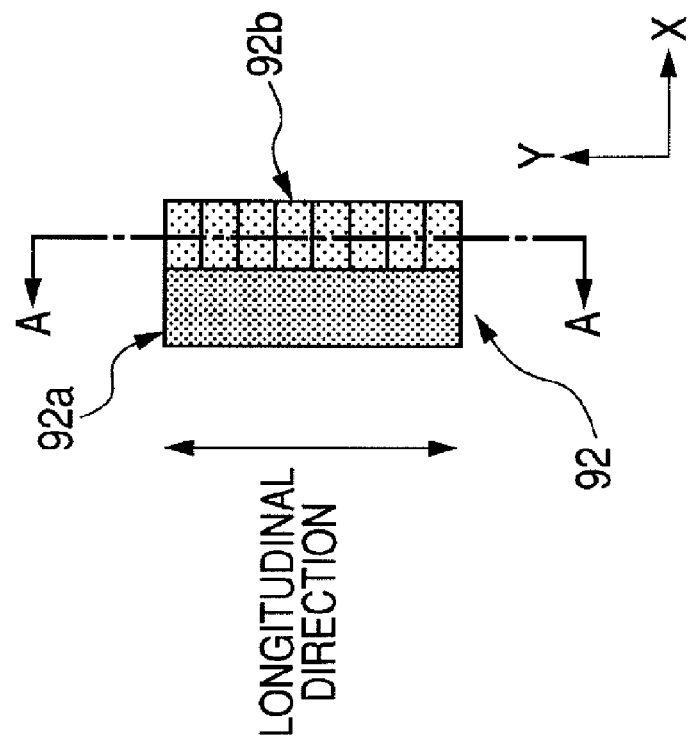

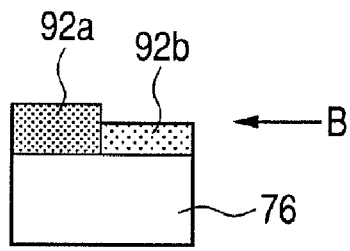
FIG. 5A
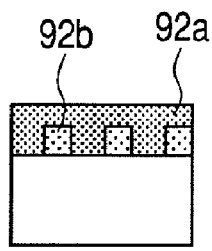
FIG. 5B
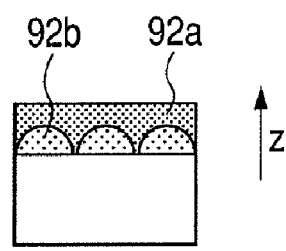
FIG. 5C
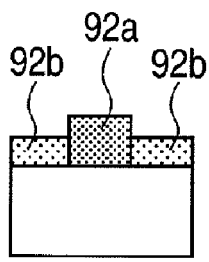
FIG. 5D
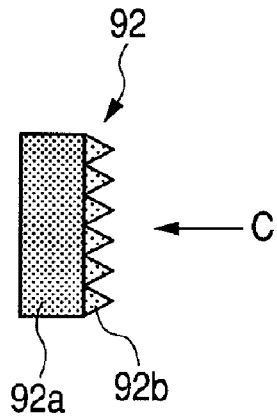
FIG. 5E1
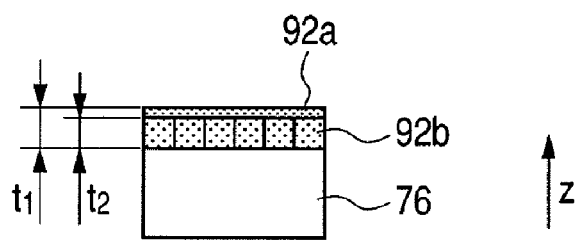
FIG. 5E2
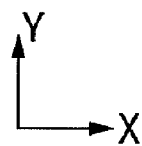

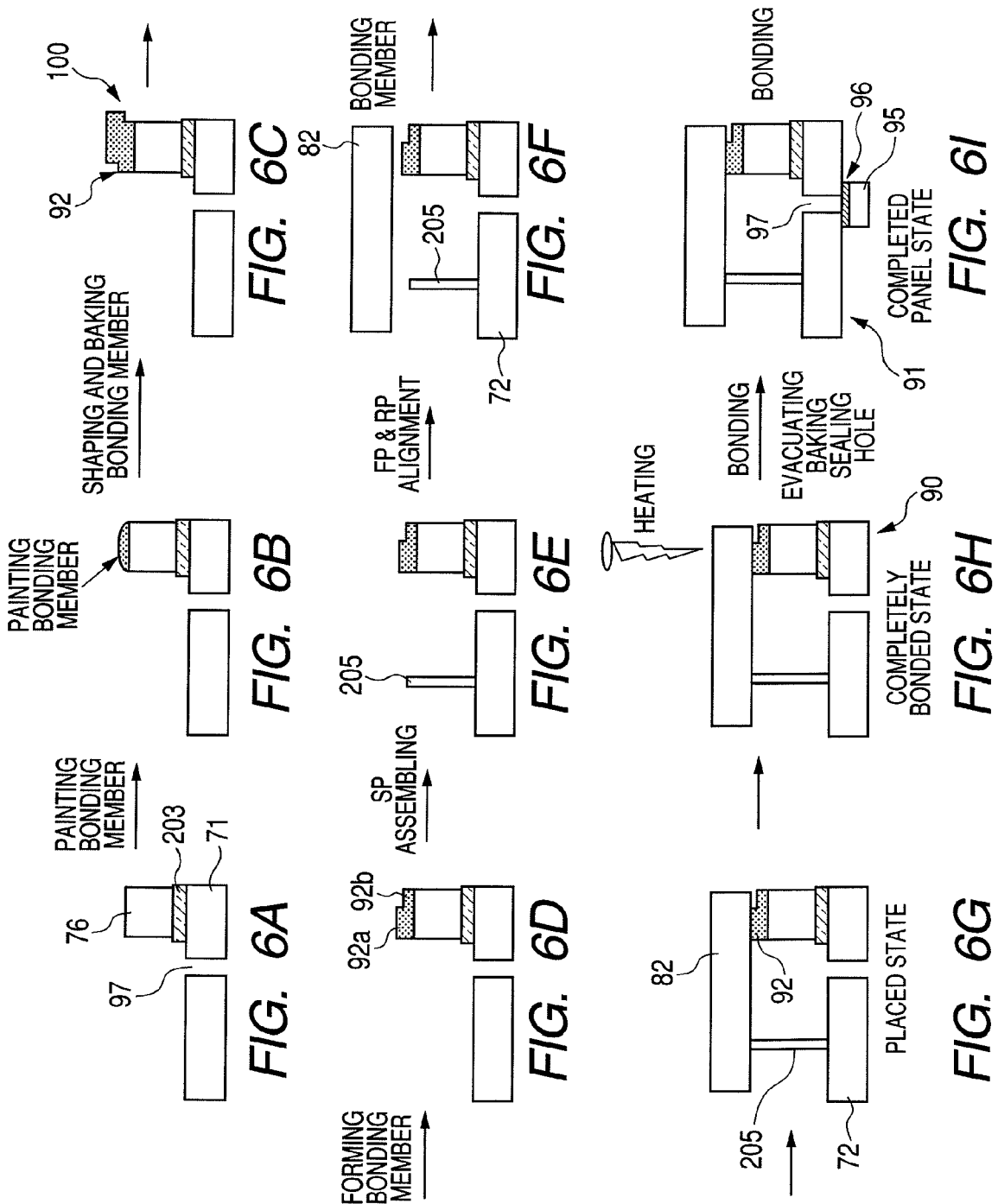

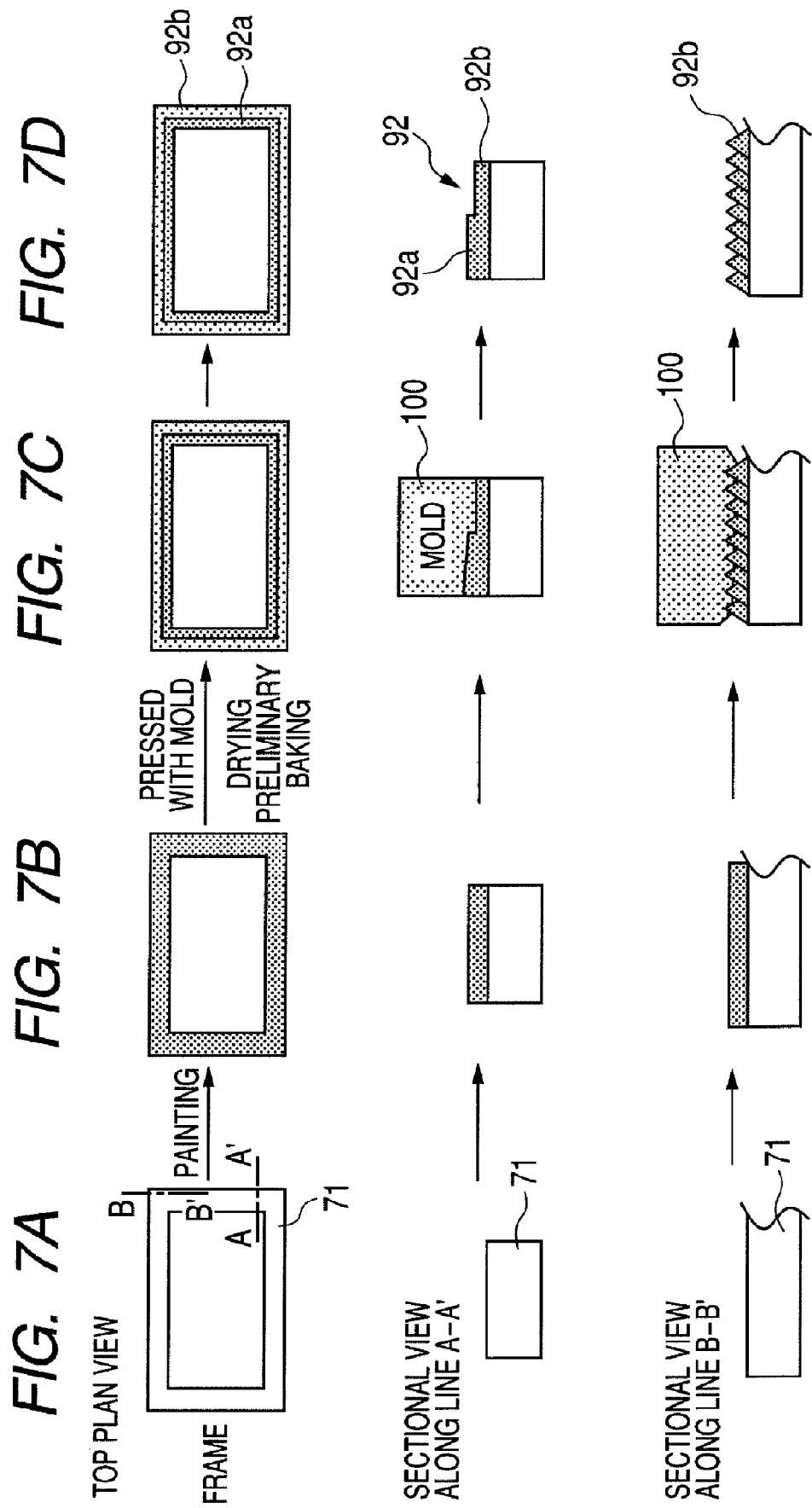

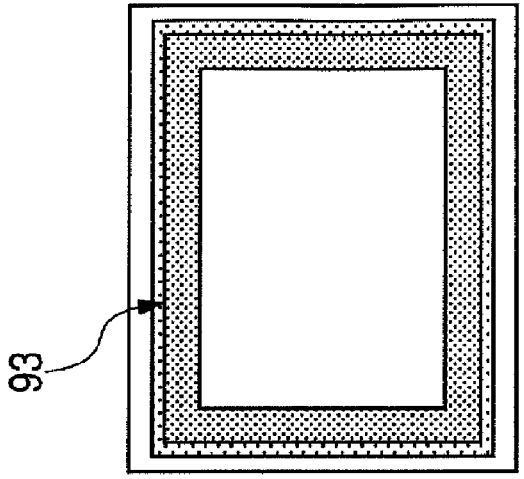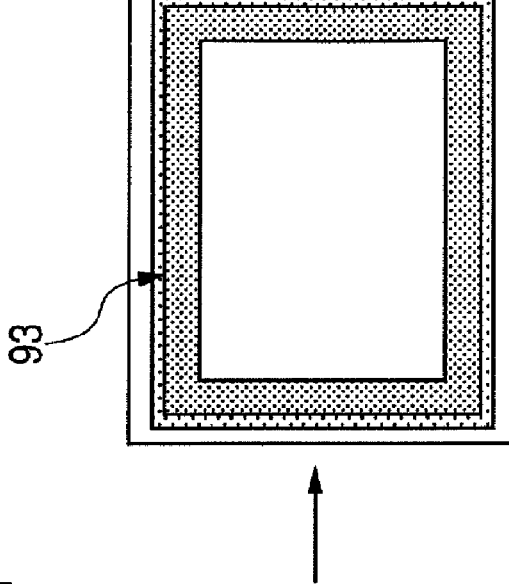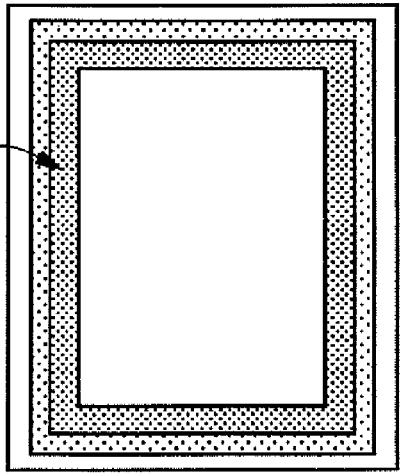

BONDING MEMBER BONDING METHOD AND METHOD FOR MANUFACTURING IMAGE DISPLAY APPARATUS

BACKGROUND OF THE INVENTION

1. Field of the Invention

The present invention relates to a bonding member, a bonding method, and a method for manufacturing an image display apparatus.

2. Description of the Related Art

An image display apparatus that has a large number of electron-emitting devices aligned thereon and is arranged so as to oppose to a fluorescent plane has been developed as a light and thin flat-type display apparatus. Such a flat-type image display apparatus (flat panel display) needs to maintain a degree of vacuum in the inner part of an envelope thereof, for instance, at $10^{-5}$ to $10^{-6}$ Pa.

A conventional method for achieving such a degree of vacuum involves releasing a gas adsorbed on the surface in the inner part of the envelope in an evacuating step through a baking treatment process of heating the envelope. However, it has been difficult to sufficiently release the adsorbed gas on the surface using such a method, so that there was a case in which a high degree of the vacuum could be hardly obtained.

Conceivably, the degree of the vacuum in the inner part of the envelope may be increased by the following method. This method includes the steps of: charging a back substrate, a side wall and a front substrate into a vacuum apparatus; baking them and irradiating them with an electron beam in a vacuum atmosphere to release the adsorbed gas on the surface; subsequently forming a getter film; and directly bonding the side wall with the back substrate and the front substrate through a bonding member in a vacuum atmosphere to seal them to form an envelope.

A bonding member, which can be used in a process of forming such a hermetically sealed envelope, is required to have the following characteristics:

1. Heat resistance: heat resistance in a baking step in a vacuum (forming a high vacuum)
2. Air tightness: capable of keeping a high vacuum (minimal vacuum leak and minimal gas permeation) but only in a part necessary to be kept vacuum,
3. Adhesiveness: adhesiveness to glass member
4. Gas-releasing property: low gas-releasing property (keeping high vacuum)

A usable bonding member having such characteristics includes a glass frit and a metal. This method can sufficiently release the adsorbed gas on the surface with an electron beam cleaning technique and can show a sufficient effect of gas absorption without oxidizing the getter film. The method also does not require the use of an exhaust pipe. Accordingly, it does not waste space in the image display apparatus.

However, when the image display apparatus is sealed in vacuum by using the glass frit, the glass frit needs to be heated at a high temperature of 350° C. or more at least once. At this time, a large amount of air bubbles generate from the glass frit, which causes a problem of decreasing the air tightness and the sealing strength of the vacuum envelope and decreases the reliability.

For this reason, a method is proposed, which is directed at achieving hermetically sealed bonding by using a glass frit and a metal as a bonding member.

Japanese Patent Application Laid-Open No. 2002-184328 discloses a metallic sealing material, which has a bent portion or a curved portion and has a bonding function.

In addition, National Publication of International Patent Application No. 2002-515392 discloses a method of forming one end of a glass frit bar into a male bonding portion, forming one end of another glass frit bar into a female bonding portion, and connecting the male bonding portion with the female bonding portion, as a method for increasing the air tightness.

Furthermore, a high accuracy lamination method is also proposed, which does not relate to air bubbles generated by heating, but includes removing air bubbles that enter into the space when affixing the adhesive sheet to the plate. Japanese Patent Application Laid-Open No. 2001-279195 discloses a method of making air bubbles that enter into the space in a laminating step escape via a through hole or a groove, which has been formed in the adhesive sheet.

SUMMARY OF THE INVENTION

As was described above, when the glass frit is heated so as to be melted, air bubbles in the inner part swell and are released out through the surface. In the case of a metal, the metal also takes air into the inner part though depending on a forming method, and the air is occasionally released out through the surface when the metal is heated and melted. The air bubbles that have been released out through the surface of a bonding member are accumulated between the bonding member and a member to be bonded by the bonding member and form a gap. Then, the gap causes insufficient bonding at the portion. For this reason, these air bubbles need to be removed. However, it is hard to say that the method in the above described Japanese Patent Application Laid-Open No. 2002-184328 prepares a sufficient region for removing the air bubbles, which are generated by heating. Accordingly, it is considered that the method disclosed in Japanese Patent Application Laid-Open No. 2002-184328 occasionally cannot achieve a desired degree of the vacuum.

For this reason, an object of the present invention is to provide a bonding member, a bonding method, and a method for manufacturing an image display apparatus, which can achieve a sufficient degree of a vacuum without forming a gap caused by air bubbles that have been released out through the surface of the bonding member.

In order to achieve the above-described object, a bonding member according to the present invention is a bonding member of a strip having a first portion with a uniform thickness and at least one second portion, which has a thickness smaller than that of the first portion and constitutes a side plane of the bonding member. The second portion has a shape such that a convexity and a concavity alternate along a longitudinal direction of the bonding member.

A bonding method according to the present invention can achieve a sufficient degree of vacuum without forming a gap caused by air bubbles, which have been released out through the surface of the bonding member.

Other features of the present invention will become apparent from the following description of exemplary embodiments with reference to the attached drawings.

BRIEF DESCRIPTION OF THE DRAWINGS

FIGS. 3A, 3A', 3B, 3C, 3C', 3D, 3E, 3F and 3G show process drawings for describing a bonding method according to the present invention by using a partially enlarged view in the vicinity of a bonded portion.

FIGS. 4A and 4B show a partial plan view and a partial cross section view along a vertical plane of a basic bonding member according to the present invention.

FIGS. 5A, 5B, 5C, 5D, 5E1 and 5E2 show views illustrating another structural example of a bonding member according to the present invention.

FIGS. 6A, 6B, 6C, 6D, 6E, 6F, 6G, 6H and 6I show views illustrating a process of manufacturing an image-forming apparatus according to Exemplary embodiment 1 of the present invention.

FIGS. 7A, 7B, 7C and 7D show views illustrating a part of a process of manufacturing an image-forming apparatus according to Exemplary embodiment 1 of the present invention, and particularly illustrating a step of forming a bonding member.

FIGS. 8A, 8B and 8C show views illustrating a part of a process of manufacturing an image-forming apparatus according to Exemplary embodiment 3 of the present invention.

DESCRIPTION OF THE EMBODIMENTS

Embodiments of the present invention will now be described below.

The embodiments of the present invention will now be described below with reference to FIG. 1, FIG. 2 and FIGS. 3A to 3G.

Figure 1:
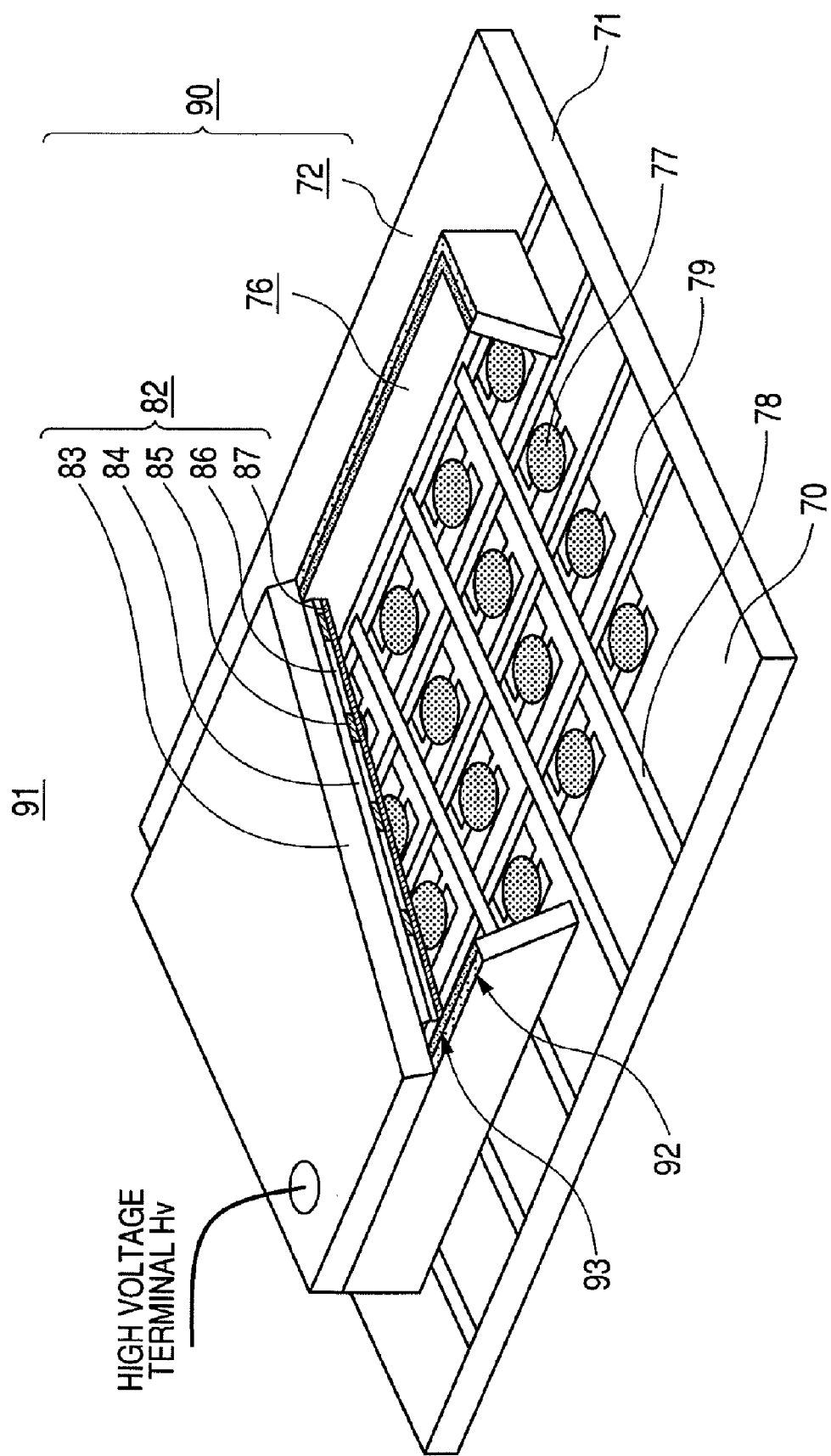
FIG. 1 is a schematic view of one example of an image display apparatus that includes a bonding member according to the present invention.
Figure 2:
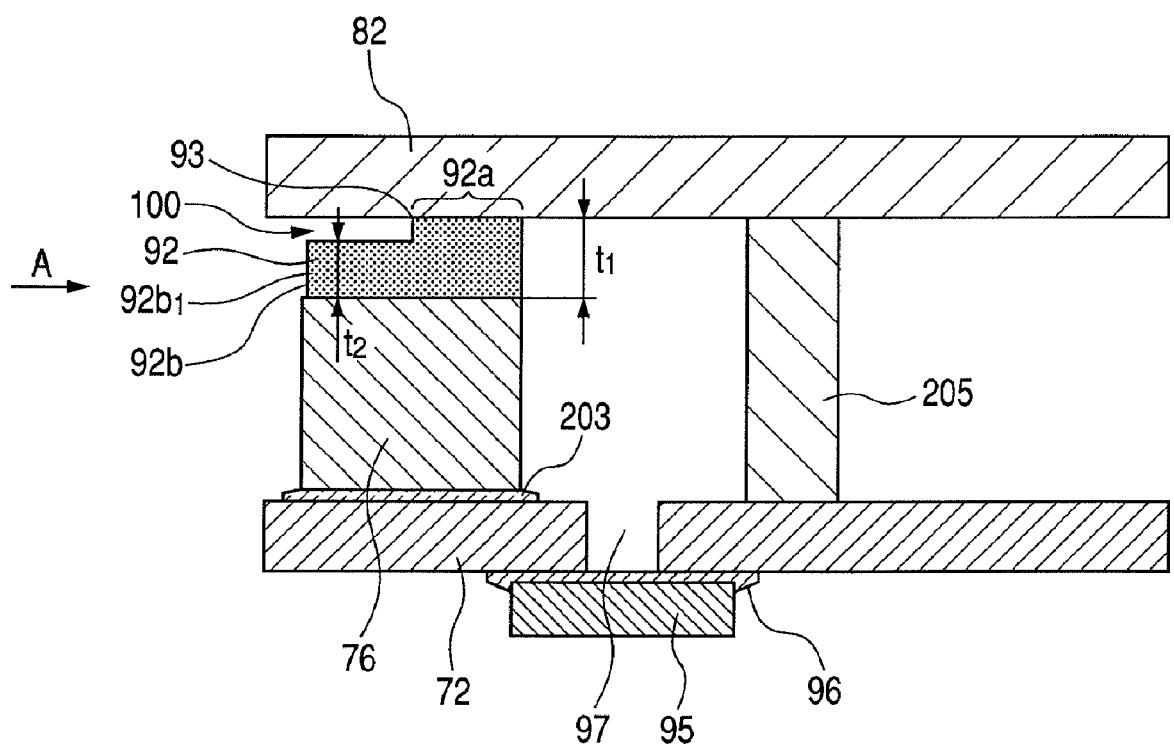
FIG. 2 is a sectional view of a bonded portion of an image-forming apparatus with a bonding member according to the present invention.

FIG. 1 is a schematic view of an image display apparatus that includes a bonding member according to the present invention. FIG. 2 is a sectional view of a bonded portion of an image-forming apparatus using a bonding member according to the present invention. FIGS. 3A to 3G show process drawings for describing a bonding method according to the present invention by using a partially enlarged view in the vicinity of a bonded portion. FIGS. 4A and 4B show a partial plan view and a partial cross-section view along a vertical plane of a basic bonding member according to the present exemplary embodiment.

An envelope 90 for keeping the inner part of an image display apparatus 91 at vacuum has a rear plate 72, a supporting frame 76, and a face plate 82. The face plate 82 is supported by a supporting frame 76, which is installed on the rear plate 72 and is arranged so as to oppose to the rear plate 72. Each bonded portion 93 in between the face plate 82 and the supporting frame 76 is sealed by a bonding member 92. An electron source 70 is fixed on the rear plate 72. This electron source 70 has m×n pieces of electron-emitting devices 77 arrayed and formed thereon (m and n are positive integers of 2 or larger and are set according to the number of objective display pixels).

The electron-emitting devices 77 are wired with m lines of wirings 78 in an X-direction and n lines of wirings 79 in a Y-direction. The wirings 78 in the X-direction and the wirings 79 in the Y-direction are formed, for instance, by photolithography. A portion that is constituted by the electron source 70, the electron-emitting devices 77, the wirings 78 in the X-direction, and the wirings 79 in the Y-direction is referred to as a multi-electron beam source. An interlayer insulation layer (not shown) is formed between both wirings at least in a portion at which the wirings 78 in the X-direction intersect with the wirings 79 in the Y-direction and keeps the wirings 78 in the X-direction at an electrically insulated state from the wirings 79 in the Y-direction.

A fluorescent film 84 made from phosphor is formed on a lower face of the face plate 82, in which three primary colors of phosphors (not shown), red (R), green (G), and blue (B), are individually coated. A black stripe 85 is arranged between the above-described respective colors of phosphors constituting the fluorescent film 84. A metal back 86 made from Al or the like is formed on the surface in a rear plate 72 side of the fluorescent film 84. The metal back 86 is formed at a thickness of 0.1 μm by sputtering, and then, a non-evaporation type getter 87, which is a Ti film, is formed at the thickness of 0.1 μm by electron beam vacuum vapor-deposition.

The inner part of the envelope 90 is kept at a vacuum pressure of $1.33 \times 10^{-4}$ Pa or less. Therefore, the envelope needs a unit for preventing the rear plate 72 and the face plate 82 from being deformed or destroyed by a pressure difference between the inner part and the outer part of the envelope 90 as a display screen of the image display apparatus 91 is enlarged. For this reason, a supporting member, which is refereed to as a spacer 205, is arranged in a space between the face plate 82 and the rear plate 72 so as to keep the space against an atmospheric pressure.

In this way, the space between the electron source 70 having the electron-emitting devices 77 formed thereon and the face plate 82 having the fluorescent film formed thereon is generally kept at several hundreds micrometers to several millimeters and the inner part of the envelope 90 is kept at a high vacuum. When voltage is applied to each electron-emitting device 77 through the wirings 78 in the X-direction and the wirings 79 in the Y-direction in the above-described image display apparatus 1, electrons are emitted from each electron-emitting device 77.

At the same time, a high voltage of several hundreds volts to several kilovolts is applied to the metal back 86 through a high-voltage terminal Hv, which accelerates the electrons emitted from the electron-emitting device 77 and makes the electrons collide against the phosphor of each color, which has been formed in the inner face of the face plate 82. Thereby, phosphors are excited, emit light, and display an image.

A method for bonding a face plate 82 to a supporting frame 76 in a bonded portion 93 with a bonding member 92 will now be described in detail below.

Firstly, the constitution of the bonding member 92 will be described. The bonding member 92 is made from at least a metal or a glass frit. In other words, a material for the bonding member 92 includes at least any one metal of Al, Ti, Sn, In, Ag, Cu, Au, Fe, and Ni as a main component, or an alloy thereof, or a glass frit which has been baked at 350° C. or higher in order to burn off an organic binder. Materials to be used in the bonding member 92 according to the present invention can include a metal of Al, In and Sn; a metal of one alloy of In—Ag and Sn—Ag; and a glass frit, which has been baked in order to burn off an organic binder.

The bonding member 92 has a first portion 92a and a second portion 92b. The second portion 92b is provided adjacent to the first portion 92a (see FIG. 2 and FIG. 4 A). The thickness of the first portion 92a is a predetermined thickness $t_1$. The thickness of the first portion 92a can be appropriately set, but can be uniform. The thickness $t_2$ of the second portion 92b is thinner than the thickness $t_1$ of the first portion 92a. The second portion 92b has such a shape in a cross-section along a vertical plane that a convexity and a concavity alternate along a longitudinal direction of the bonding member 92, as is illustrated in FIGS. 4A and 4B. In the above description, the cross-section along the vertical plane means a cross-section in a Y-Z plane in FIGS. 4A and 4B. In an example illustrated in FIG. 4B, the shape of alternating convexities and concavities is formed of an alternating triangular shape array. A side face $92b_1$ of the second portion $92b$ constitutes a side face of the bonding member 92. The bonding member 92 having the above-described shape is formed by a mold 100.

A bonding method will now be described below with reference to FIGS. 3A to 3G.

FIG. 3A illustrates a state in which a supporting frame 76 is bonded on a rear plate 72 through a glass frit 203.

The bonding member 92 is painted on the supporting frame 76 (FIG. 3B), is pressurized by the mold 100, and is heated and baked at 350° C. or higher in order to burn off an organic substance, or is heated and baked while being pressurized by the mold 100 (FIG. 3C). By doing this, the bonding member 92 acquires a shape having the first portion 92a and the second portion 92b.

Alternatively, a bonding member 92 having the first portion 92a and the second portion 92b previously formed therein may be separately prepared, instead of forming the first portion 92a and the second portion 92b directly on the supporting frame 76. The above method specifically includes the steps of: separately preparing the bonding member 92 (FIG. 3A'); pressurizing the bonding member 92 by the mold 100 and further heating and baking the bonding member 92 at 350° C. or higher in order to burn off an organic substance therefrom, or heating and baking the bonding member 92 while pressurizing the bonding member 92 by the mold 100 (FIG. 3C); and then arranging the bonding member 92 on the supporting frame 76.

Through the above-described steps, a bonding member 92 of a strip, which has at least four sides, is formed, makes the corner parts of the four sides connected to each other, and has a comb-like shape on at least one side in a longitudinal direction of the respective sides.

When the bonding member is made from a glass frit, the glass frit can be heated and baked at 350° C. or higher in order to make sure the organic substance is burned off after the mold 100 has been removed.

Subsequently, a substrate 82 is placed on the bonding member 92 (FIG. 3D) and is brought into contact with the first portion 92a of the bonding member 92 (FIG. 3E). Then, the first portion 92a is irradiated with a focused halogen lamp or a laser beam from a substrate 82 side to be locally heated (FIG. 3F). At least the first portion 92a of the bonding member 92 is melted by the heating operation, and the substrate 82 is bonded to the supporting frame 76 by the bonding member 92 (FIG. 3G). However, a salient of the second portion 92b in addition to the first portion 92a can bond the substrate 82 with the supporting frame 76. When a bonded portion 93 is viewed from a direction (A) in a state in which the bonding member 92 is bonded, the first portion 92a can be viewed as is illustrated in FIG. 4B.

When the bonding member 92 is heated, the bonding member 92 generates a large number of air bubbles from itself. In the present exemplary embodiment, the first portion 92a of the bonding member 92 is heated, and accordingly, the first portion 92a generates air bubbles. Here, the second portion 92b has a smaller thickness $t_2$ than the thickness $t_1$ of the first portion 92a and has a shape of alternating convexities and concavities in a longitudinal direction. Furthermore, a side face $92b_1$ of the second portion 92b constitutes a side face of the bonding member 92. Because the second portion 92b has such a structure, the air bubbles, which have been generated in the first portion 92a, can be released out toward the outside of an envelope 90 through a gap 100 (see FIG. 2) between the first portion 92a and the face plate 82. Furthermore, the air bubbles can be released out toward the outside of the envelope 90 through a recess $92b_2$ (see FIG. 4B) in the second portion 92b. In this way, the bonding member 92 according to the present embodiment has the recess $92b_2$ formed therein, and accordingly, can release the air bubbles out through the recess $92b_2$. The bonding member 92 can adequately release out the air bubbles not only through the recess $92b_2$, but also through the gap 100 formed by the thickness difference $(t_1-t_2)$, which is the difference between the thickness of the first portion 92a and the thickness of the second portion 92b that is smaller than that of the first portion 92a.

In other words, the second portion 92b that has the shape of an alternating convex and concave formed therein and is thinner than the first portion 92a occupies a smaller part per unit volume than the first portion 92a in the bonded portion 93. That is to say, the smaller part per unit volume has a large surface area, which comes in contact with air, and accordingly, can effectively remove the air bubbles.

As was described above, a bonding member 92 according to the present embodiment can adequately release out air bubbles, increasing the air tightness and the sealing strength of an envelope 90, and can enhance the reliability.

When a portion to be irradiated with a laser beam or the like and be bonded is a part in a direction vertical to a longitudinal direction of the bonding member 92 as is illustrated in FIG. 3G, an energy necessary for melting can be small, and a step for melting and bonding the face plate to the supporting frame can be finished in a short period of time. However, it is acceptable to bond the whole contact surface between the bonding member and a member to contact the bonding member by melting the bonding member. In this case, an area of the bonded portion increases, and accordingly, can enhance the bonding strength.

It is also acceptable to previously form an under coating layer (not shown) on one of a supporting frame 76 and a face plate 82, so as to make the bonding member 92 to easily bond the supporting frame 76 and the face plate 82.

Incidentally, a second portion 92b of the bonding member 92 may have any shape, as long as the second portion 92b has a thickness smaller than that of a first portion 92a, has the shape of an alternating convexity and concavity in a longitudinal direction of the bonding member 92, and has such a side face so as to constitute a side face of the bonding member 92.

FIG. 5A to FIG. 5E1 illustrate modified examples of the second portion 92b.

FIG. 5A is a schematic sectional view of a bonding member 92 and a supporting frame 76 in a direction vertical to a longitudinal direction of the bonding member 92. When the bonding member 92 is viewed from a direction vertical to a longitudinal direction as is illustrated in FIG. 5A, the second portion 92b has the same shape as that in FIG. 2 and FIGS. 3A to 3G. However, when the second portion 92b is viewed from a direction (B), the second portion 92b, which is a small part per unit volume, may have the shape of an alternating convexity and concavity by making a so-called comb-like shape formed therein by continuously arranging rectangles at a space, as is illustrated in FIG. 5B. Alternatively, the second portion 92b, which is the small part per unit volume, may have the shape of an alternating convexity and concavity therein by continuously arranging a semicylindrical shape as is illustrated in FIG. 5C.

Alternatively, the second portions 92b may also be formed on both sides of the first portion 92a, as is illustrated in FIG. 5D.

The second portion 92b may have a structure as is illustrated in FIG. 5E1 and FIG. 5E2. FIG. 5E1 is a partial plan view of the bonding member 92, and FIG. 5E2 is a view of the bonding member 92 when FIG. 5E1 is viewed from a direction of an arrow (C). The above-described respective shapes of the second portion 92b were described by taking such a shape so as to form a convexity and a concavity in a Z-direction as an example. However, the present invention is not limited to this shape, and may have the convexity and concavity formed in an X-direction. In other words, the second portion 92b in the above-described respective examples showed the shape of the convexity and concavity in the cross-section along the vertical plane, but the shape of the second portion 92b is not limited thereto. The second portion 92b may have the shape of the convexity and concavity in a cross-section along a horizontal plane. Here, the cross-section along the horizontal plane means a cross-section in an X-Y plane in FIG. 5E1. In structures of FIG. 5E1 and FIG. 5E2, the thickness $t_2$ of the second portion 92b is smaller than the thickness $t_1$ of the first portion 92a, and the convex and concave shapes alternate in a longitudinal direction. Furthermore, in the second portion 92b, a side face $92b_1$ of the second portion 92b constitutes a side face of the bonding member 92. In other words, the present structure has the shape of an alternating convexity and concavity formed therein and makes the second portion 92b with a small thickness occupy a smaller part per unit volume than that of the first portion 92a in the bonded portion 93. Therefore, the present structure can also adequately release out the air bubbles, which have been generated in the first portion 92a in the same way as in the above-described respective structures.

In addition, the above-described respective shapes may be used in any combination.

EXEMPLARY EMBODIMENTS

The present invention will now be described in more detail below with reference to specific exemplary embodiments. In the following description, the same members as in the above description are identified by the same reference numerals.

Exemplary Embodiment 1

An image display apparatus using a bonding member and a bonding method of the present exemplary embodiment has the same structure as an apparatus, which is schematically illustrated in FIG. 1. In the present exemplary embodiment, a glass frit is used as a bonding member 92. The present exemplary embodiment will now be described below with reference to process drawings as illustrated in FIGS. 6A to 6I and FIGS. 7A to 7D. FIGS. 6A to 6I show a process via a sectional view in the vicinity of a bonded portion in an image display apparatus. FIGS. 7A to 7D show a process for describing detailed steps of forming a bonding member 92 having a first portion 92a and a second portion 92b while using a mold 100. Incidentally, respective steps of FIG. 7A to FIG. 7D correspond to respective steps of FIGS. 6A to 6I. In addition, FIG. 7A to FIG. 7D in an upper stage are top plan views, figures in a middle stage are sectional views taken along the line A-A' of FIG. 7A in the upper stage, and figures in a lower stage are sectional views taken along the line B-B' of FIG. 7A in the upper stage.

[Step-a]
A supporting frame 76 is bonded to a rear plate 72 by a glass frit 203 (FIG. 6A and FIG. 7A).

[Step-b]
Subsequently, a paste is prepared by blending terpineol and Elvacite with a glass frit, which is a base material of the bonding member 92, and is applied to the entire perimeter of the supporting frame 76 by using a dispenser. A precursor of the bonding member 92 has the thickness of approximately 0.1 mm and the width of 2 mm. (FIG. 6B and FIG. 7B).

[Step-c]
The mold 100 is placed on the precursor of the bonding member 92, which has been painted in the step (b), and the precursor is baked at 350° C. to burn off an organic substance, such as terpineol, contained therein. Thereby, the bonding member 92 is formed into a shape having the first portion 92a and the second portion 92b. The first portion 92a has a flat shape with the thickness of 0.05 mm and the width of 1 mm over the entire perimeter. The second portion 92b has a shape in which a portion with the thickness of 0.04 mm and a portion with the thickness of 0.03 mm are arrayed at the pitch of 0.5 mm and has the width of 1 mm (FIG. 6C and FIG. 7C).

[Step-d]
The mold 100 is removed, and then, the bonding member 92 with a comb-like shape is baked at 430° C. again to burn off an organic substance contained therein (FIG. 6D and FIG. 7D).

[Step-e]
Afterwards, a spacer 205 is arranged on wirings so that the height of the spacer 205 can be the same as that of the bonding member 92 (FIG. 6E).

[Step-f and g]
A face plate 82 is aligned with a rear plate 72 having the spacer 205 arranged thereon at a predetermined position (FIG. 6F), and the face plate 82 is brought in contact with the bonding member 92 (FIG. 6G).

[Step-h]
Subsequently, a region including the first portion 92a and the second portion 92b is partially and locally irradiated with a condensed light emitted from a halogen lamp through the face plate 82 at one time (FIG. 6H). Thereby, the bonding member 92 is melted and bonds the face plate 82 to the supporting frame 76. Through the above steps, an envelope 90 is formed.

[Step-i]
Subsequently, the envelope 90 is placed in a vacuum chamber (not shown), and the inner part of the envelope 90 is evacuated through an exhaust hole 97. The entire envelope 90 is heated to 350° C. in the chamber, which is evacuated and kept at a 103 Pa level of vacuum. A non-evaporation type getter 87 is activated, then, the exhaust hole 97 is sealed with a sealing lid 95, which includes a sealing material 96 made from In and a glass substrate, and an image display apparatus 91 is formed (see FIG. 6I and FIG. 2).

As was described above, by using a bonding member 92 according to the present invention, the image display apparatus 91 could adequately release out air bubbles, which have been generated in a first portion 92a, and accordingly, could provide a bonding state showing more adequate air tightness.

Exemplary Embodiment 2

The image display apparatus in the present exemplary embodiment was manufactured in the same way as in Exemplary Embodiment 1, except that the shape of a second portion 92b was formed into the shape of FIG. 5B. Specifically, a first portion 92a had a flat shape with the thickness of 0.05 mm and the width of 1 mm over the entire perimeter, which is the same as in Exemplary Embodiment 1. The second portion 92b has a shape in which a portion with the thickness of 0.04 mm and a portion with a thickness reduced to nearly 0 mm are arrayed at a pitch of 0.5 mm and has the width of 1 mm.

The image display apparatus in the present exemplary embodiment also provided a bonded state showing excellent air tightness.

Exemplary Embodiment 3

The image display apparatus in the present exemplary embodiment is different from that in Exemplary Embodiment 1 only in that a bonding member 92 was sequentially irradiated with laser beams emitted from a plurality of semiconductor laser oscillators having the wavelength of 810 nm, the power of 100 W, and the effective diameter of 0.8 mm, when being heated, instead of condensed rays emitted from a halogen lamp.

A laser irradiation step in the present exemplary embodiment will now be described with reference to FIGS. 8A to 8C. In the following description, FIG. 8A to FIG. 8C correspond to FIG. 6G to FIG. 6H, respectively.

FIG. 8A is a top plan view illustrating a state in which a face plate 82 is brought in contact with the bonding member 92. Subsequently, a laser beam emitted from a semiconductor laser irradiation device (not shown) irradiates the bonding member 92 from a face plate 82 side. At this time, the bonding member 92 over the entire perimeter is heated by the scanned semiconductor laser irradiation device (FIG. 8B), and an image display apparatus 91 is finally formed (FIG. 8C).

In the case of the present exemplary embodiment, an effective diameter of 0.8 mm can be obtained by using the laser beam, which enables more partial and local bonding. Because of this, a bonded portion 93 is more reliably reproduced, and the image display apparatus shows more excellent air tightness.

Exemplary Embodiment 4

The image display apparatus in the present exemplary embodiment was manufactured in the same way as in Exemplary Embodiment 1, except that a bonding member 92 having a first portion 92a and a second portion 92b was previously prepared, and the bonding member 92 was arranged on the entire perimeter of a supporting frame 76. The first portion 92a has a flat shape with the thickness of 0.05 mm and the width of 1 mm over the entire perimeter. The second portion 92b has a shape in which a portion with the thickness of 0.04 mm and a portion with the thickness of 0.03 mm are arrayed at a pitch of 0.5 mm and has a width of 1 mm.

In the case of the present exemplary embodiment, a bonded portion 93 is also more reliably reproduced, and the image display apparatus shows more excellent air tightness.

Exemplary Embodiment 5

The image display apparatus in the present exemplary embodiment was manufactured basically in the same way as in Exemplary Embodiment 1, except that a sheet-shaped Al foil was used as a bonding member 92. A first portion 92a had a flat shape with the thickness of 0.05 mm and the width of 1 mm over the entire perimeter, which is the same as in Exemplary Embodiment 1. However, the present exemplary embodiment was different from Exemplary Embodiment 1 only in that the second portion 92b had a shape in which a portion with the thickness of 0.04 mm and a portion with the thickness of 0.038 mm were arrayed at a pitch of 0.1 mm, and had the width of 1 mm.

The image display apparatus in the present exemplary embodiment also provided a bonded state showing excellent air tightness.

Exemplary Embodiment 6

The image display apparatus in the present exemplary embodiment was manufactured basically in the same way as in Exemplary Embodiment 4, except that a sheet of an Sn—Ag based alloy was used as a bonding member 92. A first portion 92a had a flat shape with the thickness of 0.05 mm and the width of 1 mm over the entire perimeter, which was the same as in Exemplary Embodiment 4. However, the present exemplary embodiment was different from Exemplary Embodiment 4 in that the second portion 92b had a shape in which a portion with the thickness of 0.04 mm and a portion with the thickness of 0.03 mm were arrayed at a pitch of 0.1 mm and had a width of 1 mm. The image display apparatus according to the present exemplary embodiment, which has been manufactured as was described above, shows the same effect as in Exemplary Embodiment 2.

The image display apparatus in the present exemplary embodiment also provided a bonded state showing excellent air tightness.

The above-described exemplary embodiments were described by using an example in which a non-evaporation type getter 87 was installed on a face plate 82. The non-evaporation type getter may be arranged on wirings (not shown) of a rear plate 72.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-000455, filed Jan. 7, 2008, which is hereby incorporated by reference herein in its entirety.

What is claimed is:

1. A method of bonding a first member to a second member through a strip of bonding member comprising steps of:

placing, between the first member and the second member, the strip of bonding member having first and second portions adjacent to each other, wherein the first portion has a predetermined thickness, the second portion has a thickness smaller than that of the first portion, and the second portion has a shape such that a convex and a concave are arranged alternatingly along a longitudinal direction of the strip of bonding member; and melting the first portion of the strip of bonding member, and bonding the first member to the second member.

2. A method of manufacturing an image display apparatus comprising an envelope having a rear plate, a supporting frame placed on the rear plate and a face plate bonded to the supporting frame through a strip of bonding member in opposition to the rear plate comprising steps of:

placing, between the face plate and the supporting frame, the strip of a bonding member having first and second portions adjacent to each other, wherein the first portion has a predetermined thickness, a second portion has a thickness smaller than that of the first portion, and the second portion has a shape such that a convex and a concave are arranged alternatingly along a longitudinal direction of the strip of bonding member; and melting the first portion of the strip of bonding member, and bonding the face plate and the supporting frame.

* * * * *